Aug. 11, 1959   H. J. McCREARY   2,899,520
ELECTROMAGNETIC RELAY
Filed Aug. 8, 1957
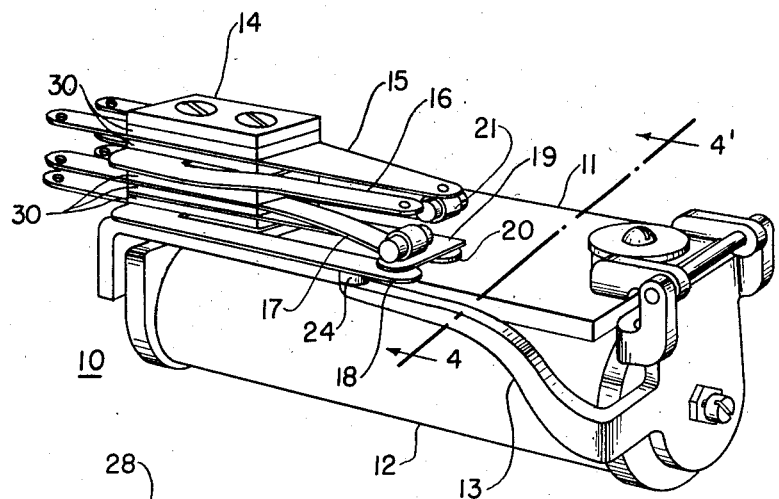
FIG. 1
FIG. 2
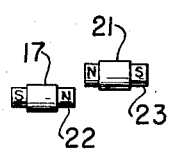
FIG. 3
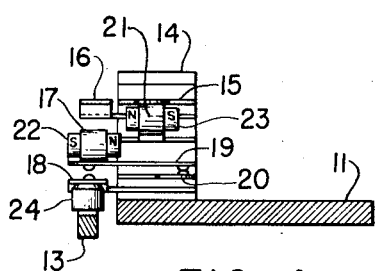
FIG. 4
SECTION 4-4'
FIG. 5
INVENTOR.
HAROLD J. McCREARY
BY C. R. Siper
ATTY.

United States Patent Office 2,899,520
Patented Aug. 11, 1959

2,899,520

ELECTROMAGNETIC RELAY

Harold J. McCreary, Lombard, Ill., assignor to General Telephone Laboratories, Incorporated, Chicago, Ill., a corporation of Delaware Application August 8, 1957, Serial No. 677,123

6 Claims. (Cl. 200—104)

This invention relates to electro-mechanical relays and more particularly to those of the latching or odd-even type.

In a relay of this type it is required that the relay contacts assume a first position on the first and all subsequent odd numbered operations. This first position is maintained even after the relay is deenergized. On all even numbered operations the contacts will assume a second position which also will be maintained after de-energization of the relay coil.

The usual methods of providing this feature include all manner of mechanical linkages, twin coils and combinations of electro and permanent magnets. It is the last mentioned of these methods with which the present invention is concerned.

It is an object of the present invention to provide a relay which responds to succeeding operations by alternately assuming each of two positions.

It is a further object of the invention to provide a relay having within its spring pileup, two cantilever springs each bearing a permanent magnet at its free end. The magnets are juxtaposed with like poles adjacent one another to mutually repel one another.

A feature of the invention resides in the use of repulsion by like magnetic poles to move the magnets relative to one another thereby make and break electrical contact between adjacent springs.

These and other features will be seen on viewing the drawings.

The drawings include Fig. 1 which shows the complete relay.

Fig. 2 shows the magnetic bearing spring. Fig. 3 shows the first of the magnet positions and Fig. 4 shows a view of the spring pileup with the magnets in the position of Fig. 3. Fig. 5 shows the magnets in the second position.

Fig. 1 shows the relay 10 with coil 12 and armature 13. Secured to the relay heelpiece 11 is a spring pileup having contact springs 15, 16, 18, 19 and 20 and permanent magnet bearing spring 28. These springs are electrically insulated from one another by insulators 30 in a generally known manner.

Permanent magnets 22 and 23 are securely mounted into the formed extremities 17 and 21 of spring 28 as in Fig. 2. The magnets are placed with their like poles adjacent as shown in Fig. 3. The spring arms having extremities 17 and 21 constrain the magnets from horizontal movement so that the repulsion caused by the like poles causes the magnets to assume a relative position such as shown in the figures. The position the details of which are shown in Figs. 1, 2, 3 and 4 will be called the first position. Magnet 23 and its holder arm 21 have assumed the upper level and magnet 22 in holder 17 the lower level. In this first position, holder arm 21 contacts spring 15 to form a complete circuit from spring 28, arm 21, and contact spring 15. Also in this first position, springs 19 and 20 are in contact. Further, holder 17 may be in contact with spring 19. In this manner a complete circuit may be traced from contact spring 20 to contact spring 15 through the permanent magnet bearing spring 28.

When relay coil 12 is energized, armature 13 is drawn against the core of coil 12 and armature buffer 24 forcibly moves spring 18. On movement, spring 18 forms a make contact with spring 19 and breaks the combination of spring 19 and spring 20. Also the spring 19 forces spring arm holder 17 and its permanent magnet 22 in a vertical direction. The force imparted to the magnet 22 is of sufficient intensity to overcome the inertia of magnet 22 and the repulsion force of both magnets.

The magnet 22 is given sufficient momentum to cause its center to rise relatively above that of magnet 23. The repulsion force of the magnets then cumulatively adds to the upward driving force imparted to magnet 22 and its holder 17. Also, the repulsion forces of the permanent magnets forces magnet 23 away from magnet 22 and hence holder spring 21 is moved downward out of contact with spring 15 and into contact with spring 19. Holder 17 then contacts spring 16 completing a circuit from spring 18, through spring 19, arm 21, and arm 17 of spring 28 to spring 16. This constitutes the second position. The relative magnet locations of this position are shown in Fig. 5.

When the relay coil is deenergized, buffer 24 resumes its normal position with springs 19 and 20 in contact and springs 18 and 19 out of contact. Spring 19 continues to contact holder 21.

Therefore, the normal condition of the second position has contact between magnet bearing spring 17 and spring 16 and also between contact springs 19 and 20. In this position there may also be considered a continuity from spring 20, through contacts of spring 19, holder 21, spring 28, holder 17 to spring 16. This position would be maintained until the next energization.

The next energization of coil 12 would deflect magnet 23 upward past magnet 22 to reassume the first position. This first position would then be retained until the next operation of the relay.

In this way the second position would be assumed on alternate operations of the relay, comprising the odd numbered operations and the first position would be re-assumed on all even operations. Each position would be retained until the next subsequent energization of the relay coil operates armature 13.

It will be understood that but a single embodiment has been shown of the many which could be produced by variations and additions to the present invention. It is the intention therefore to be limited only as indicated by the appended claims.

What is claimed is:

1. In an electro-magnetic relay having a single coil, an armature and a spring pileup of cantilever springs, said armature responsive to energization of said coil to be impelled against said spring pileup, a first of said cantilever springs comprising an armature spring contacted by said armature, a second of said cantilever springs comprising a flexible bifurcated spring having two arms at its free end, each of said arms securely bearing a permanent magnet at its free end, said magnets each having a like pole adjacent said other magnet, repulsion of said magnets causing one of said magnets to rest in a plane above the plane of said other magnet, said one magnet bearing arm spring thereby completing a circuit to a rigid third spring of said cantilever springs, said other magnet impelled upward on energization of said coil and subsequent impellation of said armature against said first spring, said other magnet thereupon deflected toward a position in a plane above that of said one magnet, said rigid third spring restraining said one magnet bearing arm from movement outward from said armature, said other magnet thereupon forcing said one magnet by magnetic repulsion to a lower plane, said other magnet bearing spring thereby completing a circuit to a fourth of said cantilever springs, said one magnet on being forced to a lower plane opening the prior mentioned circuit to said third spring.

2. In an electro-magnetic relay, an armature controlled by the operation of said relay to actuate an armature spring, a first permanent magnet responsive to the first actuation of said armature spring to be impelled away from said armature, another permanent magnet repellently aligned to said first magnet, means for channeling said first and second magnets into parallel motive paths for utilizing the mutual repulsion of said magnets to force said other magnet towards said armature spring, said channeling means thereafter closing a first circuit, said armature spring on the next operation of said relay impelling said other magnet away from said armature spring, said channeling means channeling the mutual repulsion of said magnets to force said first magnet toward said armature spring, said channeling means thereupon opening said first circuit and closing a second circuit.

3. In an electromagnetic relay, an armature spring, a magnet bearing spring having a first magnet in contact with said armature spring and a second magnet, said magnets each having a like pole adjacent the other magnet, said magnet bearing spring constraining said second magnet to assume a repelled position away from the armature spring, first contact means closed by said second magnet assuming said away-from-armature spring position, said armature spring actuated in response to the operation of said relay to force said first magnet away from said armature spring and past the center of said second magnet, said first contact means including a rigid stationary contact spring restraining said second magnet from motion outward from said armature due to said mutual repulsion, said first and second magnets thereupon mutually repelling, said second magnet thereupon contacting said armature spring and said first magnet assuming the away position, second contact means closed by said first magnet assuming the away position, said magnet bearing springs and said magnets cooperatively maintaining said second contact means closed.

4. A bi-stable electromagnetic relay having two steady state conditions, each of said conditions controlled by alternate succeeding operations of said relay, a first contact combination closed on the first and all successive odd numbered operations of said relay, a second contact combination closed on the second and all succeeding even numbered operations of said relay, means for alternately closing said first and second contact combinations comprising a pair of mutually repellently mounted permanent magnets, means responsive to the operation of said relay for alternately driving one of said magnets in a direction outward from the relay past the center of said other magnet, said magnets mutually repellent to drive said one magnet further outward and said other magnet towards said driving means, said other magnet thereby positioned to be acted upon by said driving means on the next operation of said relay.

5. In a circuit closing device, a spring pileup comprising a first spring, a second spring and a bifurcated spring having two parallel arms with the first arm below the first spring and the second arm below the second spring, a first permanent magnet secured to the free end of said first arm and a second permanent magnet secured to the free end of said second arm with like poles of said permanent magnets being adjacent and separated by an air gap, said arms being flexible to enable movement of said permanent magnets in parallel planes in response to the magnetic repulsion of the like poles of said permanent magnets whereby said second magnet is normally positioned above said first magnet and said second arm normally engages said second spring, circuit closing means for moving said first arm and said first magnet in one direction in its plane past the second magnet to cause said first arm to engage said first spring, said magnetic repulsion of the like poles effective in response to said movement of said first magnet past said second magnet to cause said second magnet to move in the opposite direction in its plane and the second arm to disengage from said second spring and engage said circuit closing means.

6. In a circuit closing device as claimed in claim 5, said circuit closing means effective on restoration to disengage from said first arm while said permanent magnets and said arms are maintained in their operated positions with said first arm in engagement with said first spring and said second arm disengaged from said second spring but engaged by said circuit closing means.

References Cited in the file of this patent
UNITED STATES PATENTS

| | | |
|---|---|---|
| 2,520,935 | Hubbell | Sept. 5, 1950 |
| 2,521,723 | Hubbell | Sept. 12, 1950 |
| 2,617,906 | Stehlik | Nov. 11, 1952 |
| 2,834,850 | Earling | May 13, 1958 |

FOREIGN PATENTS

| | | |
|---|---|---|
| 346,137 | Great Britain | Apr. 9, 1931 |